Sept. 3, 1968          H. NERWIN          3,399,843
FILM ADVANCING AND REWINDING MECHANISM
Filed Jan. 27, 1967
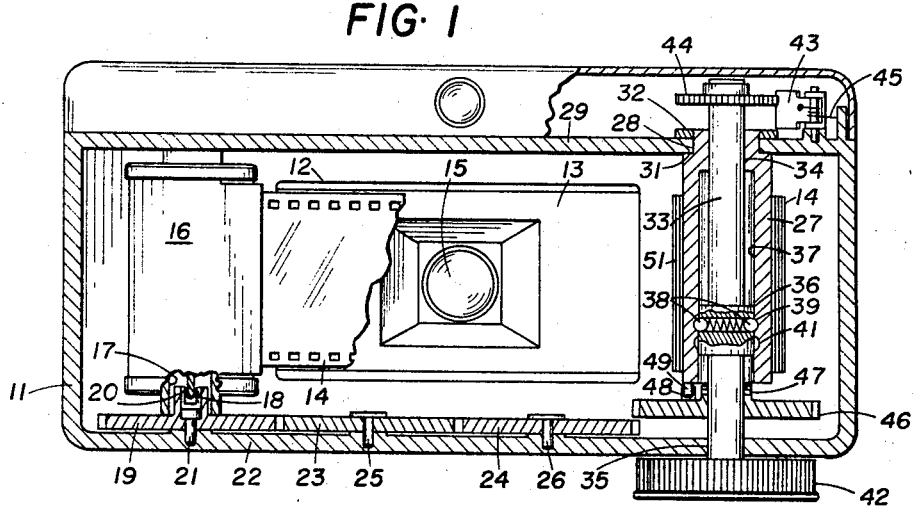
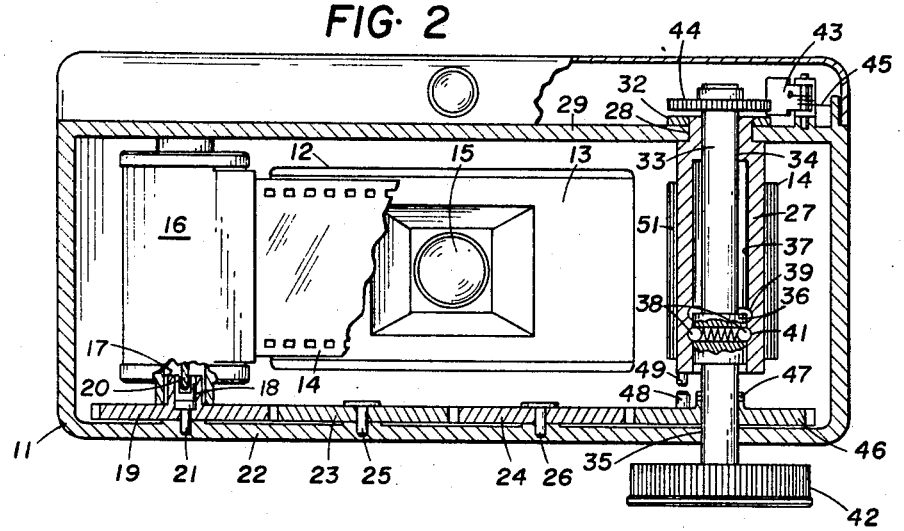
HUBERT NERWIN
INVENTOR.
BY Malcolm J. Dunn
Robert W Hampton
ATTORNEYS

United States Patent Office 3,399,843
Patented Sept. 3, 1968

3,399,843
FILM ADVANCING AND REWINDING
MECHANISM
Hubert Nerwin, Rochester, N.Y., assignor to Eastman
Kodak Company, Rochester, N.Y., a corporation of
New Jersey
Filed Jan. 27, 1967, Ser. No. 612,201
5 Claims. (Cl. 242—71.6)

ABSTRACT OF THE DISCLOSURE

A camera, such as a cassette type, in which the knob or other control member used to advance the film is also employed to rewind it.

---

The present invention is directed to film moving mechanisms in cameras.

In many cameras, typically 35 mm. cameras employing film cassettes, the film is unwound from the supply spool or the supply core within the cassette as the film is advanced by the operation of a winding knob or lever. When the entire film has been exposed, the film advancing mechanism is disabled to allow the film to be rewound onto the supply spool or core, which is accomplished by means of a separate rewind knob, crank or the like, whereupon the rewound supply spool or cassette is removed from the camera for processing.

To minimize the bulkiness of such a camera, it is known to mount the rewinding member in such a manner that it can be folded or retracted into the camera body when it is not in use. Also, to eliminate the need for separate, manually operated means for disabling the winding means while the film is being rewound, the movement of such a rewinding member to its operative position can serve automatically to accomplish this disabling function. However, it should be apparent that all of these arrangements employ a separate external rewinding member which must be polished or otherwise finished for aesthetic purposes and which may involve rather complicated structure, particularly if the member is adapted for movement between an operative and an inoperative position. Furthermore, since all of these systems require the operation of one member to advance the film and of another member to rewind it, any such camera presents an element of possible confusion to a photographer who is not entirely familiar with its mode of operation.

The present invention overcomes entirely these various disadvantages by means of the simple but heretofore unobvious concept of utilizing the same externally accessible film transport control member, such as a lever or knob, to accomplish both the winding and rewinding functions, thereby eliminating entirely the separate rewinding member.

Various means for accomplishing the invention will be apparent from the following detailed description of an illustrative preferred embodiment thereof, reference being made to the accompanying drawings in which like reference numerals denote like elements and in which:

FIG. 1 is a rear elevational view of the camera with the camera back removed and with portions of the internal structure shown cross sectioned or broken away to illustrate details of the film transport mechanism, the components of which are illustrated in the positions assumed thereby during the film winding operation; and FIG. 2 corresponds to FIG. 1 and shows the respective positions of the various elements of the film transport mechanism positioned to rewind the film.

In the illustrated embodiment of the invention, the subject camera comprises a generally box-like housing 11 including a rearwardly extending film guide member 12 defining a flat film support surface 13 adapted to support an area of roll film strip 14 at the focal plane of objective lens 15. The film cassette 16 is located adjacent one side of member 12 with its internal spool member 17 rotatably engaged by a slotted projection 18 extending upwardly from gear 19 and straddling web 20 in the hollow core of the spool member. Gear 19 is supported for rotational movement on housing 11 by a stud 21, extending into the lower housing wall member 22, with corresponding gears 23 and 24 being supported similarly by studs 25 and 26, respectively, to form a constantly meshed three-gear train.

At the side of housing 11 opposite the film cassette, the end of the film strip is attached to a film take-up core 27, which is rotatably supported at its top end in bore 28, extending through upper wall member 29, and is prevented from moving axially by shoulder 31 and collar 32. A shaft 33 is supported rotatably near its top end by bore 34 in the take-up core and at its bottom end by bearing hole 35 in the lower housing wall member 22. An enlarged intermediate portion 36 on shaft 33 rotatably supports the lower end of core 27 by engagement with its enlarged internal bore 37, and includes a pair of spring-loaded detent balls 38 adapted resiliently to retain the shaft in either the position shown in FIG. 1 or that shown in FIG. 2 by engagement of the balls with the corresponding annular detent groove 39 or 41.

The film take-up core 27 and the slotted projection 18 which extends upwardly from gear 19 together comprise movable film transport means for displacing a portion of the strip 14 of roll film in either a first or second direction.

Regardless of the axial position assumed by the shaft, it is rotatable in a clockwise direction, as viewed from the bottom of the camera, by means of a movable film transport control member comprising a rotatable, externally accessible knob 42 attached to the lower end thereof. Counterclockwise rotation of the shaft, however, is prevented by a pawl 43, biased against a ratchet wheel 44 at the top of the shaft by a spring 45.

The knob 42 is adapted for selective association in cooperating driving relation with said transport means for moving said portion of the strip 14 in either of the two directions. Coordinating means for making the selective association will now be described.

Inwardly adjacent the lower wall 22 of the camera housing, a gear 46 is attached to shaft 33 by a pin 47. When the shaft has been moved to its upper position shown in FIG. 1, by pressing the winding knob toward the camera housing, gear 46 is out of engagement with the laterally adjacent gear 24 but is rotatably coupled to core 27 by the engagement of upstanding stud 48 on the gear with a depending pin 49 on the lower end surface of the core. Accordingly, as the winding knob is rotated in a clockwise direction, the core is rotated similarly to wind the film strip across the film guide surface and onto the core as shown at 51.

When an exposure counter device or the like (not shown) indicates that the film has been exposed and is ready to be rewound into the cassette, knob 42 is pulled manually away from the housing to the position shown in FIG. 2, thereby engaging gear 46 with the adjacent gear 24 and disengaging stud 48 from pin 49. Accordingly, as the winding knob is now rotated in a clockwise direction, counterclockwise rotation is imparted to spool member 17 in the cassette by the gear train comprising gears 19, 23, 24, and 46. As the film is rewound into the cassette by such rotation of the spool member, the take-up core is now free to rotate in the same direction as film is unwound therefrom, retarded only by the slight braking effect of the detent balls riding in groove 41, which maintains a slight tension on the film to insure that it is wound smoothly and evenly within the cassette.

Although this construction employs the axially movable winding knob as the means for shifting the mechanism from one mode of operation to the other, this function could be accomplished by a separate knob, slide member or the like, if desired, in which case the winding knob or the equivalent could be adapted to remain in a fixed axial position by keying it to the axially movable shaft 33. Likewise, while the above-described camera employs a winding knob as the control member for the film winding and rewinding mechanism, it should be apparent that a lever or other similar device could be substituted readily for such a winding knob, or that the operating means could comprise a power-operated device such as an electric motor or a spring motor. Furthermore, in any such embodiment or variation, it should be appreciated that a sprocket member or similar means might be employed to impart motion to the film, for example, in a camera in which the film is wound upon itself in a take-up chamber, in which case the sprocket member or its equivalent would be operatively associated with the driving member by means of a mechanism similar to those previously described.

Although the foregoing description relates to a specific embodiment of the invention, it is obvious that variations and modifications thereof can be effected within the spirit and scope of the invention. Accordingly, the present disclosure is to be considered as illustrative and not as limiting the scope of the invention which is defined by the following claims.

I claim:
1. In a camera including:
  (a) movable film transport means operatively engageable with a strip of photographic film to displace a portion of said strip in either
    (1) a first direction or
    (2) a second direction,
  the improvement comprising:
  (b) a single externally accessible film transport control member manually movable both rotatively and axially and
  (c) coordinating means actuatable for selectively associating said control member in cooperating driving relation with said transport means in either
    (1) a first mode of cooperation in which manual rotation of said control member effects movement of said portion by said transport means in said first direction or
    (2) a second mode of cooperation in which manual rotation of said control member effects movement of said portion by said transport means in said second direction,
  said coordinating means being actuated by manual axial movement of said control member to establish selectively either of said modes of cooperation between said control member and said transport means.

2. The invention defined by claim 1 in which said control member is unidirectionally rotatively movable and bidirectionally axially movable.

3. In a camera including means for winding an elongate strip of photographic film from a rotatable film supply member past an exposure position onto a rotatable film take-up member and for rewinding said strip from said take-up member onto said supply member, the improvement comprising:
  (a) a single externally accessible film transport control member manually movable both rotatively and axially and
  (b) motion translating means including
    (1) means for operatively engaging said control member in driving relation with said take-up member for translating manual rotation of said control member into rotational film winding movement of said take-up member and
    (2) means for operatively engaging said control member in driving relation with said supply member for translating manual rotation of said control member into rotational film rewinding movement of said supply member,
  said motion translating means being actuated by manual axial movement of said control member to establish selectively which one of said take-up member and said supply member is to be engaged by said control member.

4. The invention defined by claim 3 in which said motion translating means includes a power transmitting element movable between
  (a) a first position in which said control member thereby is operatively engaged with said take-up member and operatively disengaged from said supply member and
  (b) a second position in which said control member thereby is operatively engaged with said supply member and operatively disengaged from said take-up member.
said element being movable between said positions by manual axial movement of said control member to establish selectively which one of said take-up member and said supply member is to be engaged by said control member.

5. In a camera including:
  (a) first means for rotatably supporting a film supply member,
  (b) second means for rotatably supporting a film take-up member, and
  (c) a unidirectionally rotatable driving member,
  the improvement comprising:
  (d) third means for operatively coupling said driving member to a film take-up member so supported for translating rotation of said driving member into rotational movement of said take-up member in a predetermined rotational direction,
  (e) fourth means for uncoupling said driving member from said take-up member and operatively coupling said driving member to a supply member so supported for translating rotation of said driving member into rotational movement of said supply member in a direction opposite to said predetermined rotational direction of movement of said take-up member, and
  (f) a single externally accessible film transport control member operatively connected to said driving member, said control member being manually movable rotatively to effect rotation of said driving member and manually movable axially to establish selectively which one of said third means and said fourth means is to be operative.

References Cited
UNITED STATES PATENTS

| 1,217,444 | 2/1917 | Hardy | 242—71.6 |
| 2,140,445 | 12/1938 | Mihalyi | 242—71.6 |
| 3,061,222 | 10/1962 | Beach | 242—71.6 X |

STANLEY N. GILREATH, *Primary Examiner.*

N. L. MINTZ, *Assistant Examiner.*